May 6, 1958 C. V. HERRON 2,833,075
APPARATUS FOR TAKING CARE OF FISH LINES
Filed Sept. 17, 1956
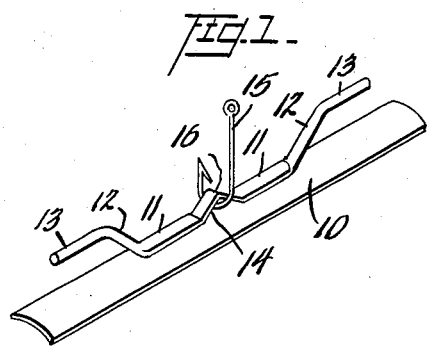
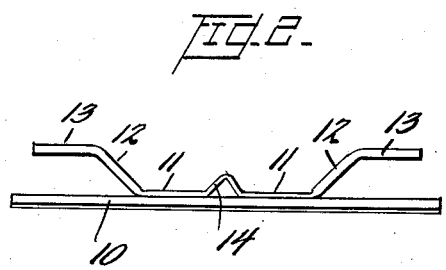
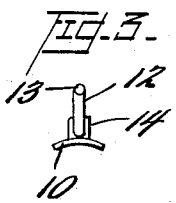
INVENTOR
Charles V. Herron,
BY
ATTORNEY

United States Patent Office 2,833,075
Patented May 6, 1958

2,833,075

APPARATUS FOR TAKING CARE OF FISH LINES

Charles V. Herron, Evansville, Ind.

Application September 17, 1956, Serial No. 610,213

1 Claim. (Cl. 43—25.2)

My said invention relates to an apparatus for taking care of fish lines and fish hooks when not in use, as when being transported from one place to another between trips, or for storing the same safely out of the way and keeping the same in good condition free from danger of damage by rodents or other injurious influences. It is an object of the invention to store fish hooks and other like impedimenta in such manner that they will not be liable to be damaged or entangled and will not be liable to injure other persons, animals sporting goods or the like.

It is an object of the invention to store fishing hooks and rods and the like in such manner that they can be put into use expeditiously, without any delay for need to unwind or unwrap the same or to put them into condition for use and without the danger of the same being entangled with other objects, as by engagement of hooks with cloth or the like, it being intended that the free portion of the line between the fish hook and the rod will be held in place by winding the same about the rod and thus holding the hook in place, preferably with the shank of the hook held against the rod and parallel thereto and usually with the barb of the hook covered with the wrappings of the fish line.

In the drawings, Fig. 1, is a perspective of the device of my invention as it appears, for instance, in a show case, Fig. 2, a side elevation, and Fig. 3, a cross section of an intermediate portion of same.

In the drawings, reference character 10 indicates an arcuate portion of a support that may fit about the portion of a fishing rod or the like, so that it may be held securely in place, as by wrapping a portion of the line 15, though it need not be so wrapped about it. Mounted on the support 10 there is a bracket having portions 11—11 that may fit closely on the support 10 and preferably are fixed thereto as by brazing or pivoting. Adjacent parts extend angularly from the support and terminate in extensions 13—13. Preferably the parts 12 and 13 are round in cross section and between the parts 11—11 there is a widened portion 14 that is bowed upward with respect to parts 11—11 and provides means for holding the shank 15 of the hook and serving also to hide the hook 16. Preferably but not necessarily the spaced parts 13—13 will be round in cross section so as to reduce danger of fraying by sharp corners, while the parts 11 and 14 are flattened.

It will be evident that in normal use the support 10 will lie flat against a fishing rod while the portions 13—13 will be partially spaced away from it to provide room for the bulk of the line which is wound around oppositely extending portions 12—12. Obviously the windings of line between the parts 12—12 may force the hook portion to lie approximately flat against the support 10.

It will be obvious to those skilled in the art that numerous variations may be made in the device of my invention, all without departing from the spirit of the invention, and therefore I do not limit myself to what is shown in the drawings and what is described in the application but only as indicated in the claims.

What I claim is:

In a combined fishing hook and line holder, an elongated supporting portion having a concave undersurface for attachment to a fishing pole, a bracket carried by said supporting portion, said bracket including a pair of aligned straight stretches secured to the upper surface of said supporting portion, said stretches being spaced by an upwardly bowed portion providing an aperture of sufficient size to receive the shank of a fish hook and permit passage therethrough of the barb portion of the hook, an outwardly directed angularly inclined portion on the free extremity of each of said straight stretches, and an outwardly extending finger on the free extremity of each of said inclined portions, said fingers lying in a plane substantially parallel to that of said supporting portion but spaced therefrom whereby a fishing line may be wound around said inclined portions to retain the shank of the fishing hook in said aperture, the outwardly extending fingers retaining said fishing line upon said bracket.

References Cited in the file of this patent

UNITED STATES PATENTS

| 404,747 | Teed | June 4, 1889 |
| 1,034,222 | Dych | July 30, 1912 |
| 2,721,413 | Sidel | Oct. 25, 1955 |

FOREIGN PATENTS

| 70,177 | Norway | Mar. 18, 1946 |